(12) United States Patent
Jin et al.

(10) Patent No.: US 6,515,721 B2
(45) Date of Patent: Feb. 4, 2003

(54) LIQUID CRYSTAL DISPLAY DEVICE INCLUDING A SPACER WITH ADHESIVE BETWEEN FRAME AND A PERIPHERY OF A PRINCIPAL SURFACE OF A SUBSTRATE

(75) Inventors: Nobutaka Jin, Mobara (JP); Atsushi Nemoto, Chiba (JP)

(73) Assignees: Hitachi, Ltd., Tokyo (JP); Hitachi Device Engineering Co., Ltd., Mobara (JP)

( * ) Notice: Subject to any disclaimer, the term of this patent is extended or adjusted under 35 U.S.C. 154(b) by 138 days.

(21) Appl. No.: 09/768,053

(22) Filed: Jan. 24, 2001

(65) Prior Publication Data
US 2001/0010569 A1 Aug. 2, 2001

(30) Foreign Application Priority Data

Jan. 28, 2000 (JP) ........................................ 2000-019426

(51) Int. Cl.[7] ..................... G02F 1/1333; G02F 1/1339; G02F 1/1345
(52) U.S. Cl. ......................... 349/58; 349/122; 349/155; 349/150
(58) Field of Search ........................... 349/58, 155, 150, 349/122, 152

(56) References Cited

U.S. PATENT DOCUMENTS

| | | | | | |
|---|---|---|---|---|---|
| 5,398,128 | A | * | 3/1995 | Tajima et al. | 349/150 |
| 5,838,412 | A | * | 11/1998 | Ueda et al. | 349/150 |
| 6,111,629 | A | * | 8/2000 | Matsuhira et al. | 349/150 |
| 6,172,732 | B1 | * | 1/2001 | Hayakawa et al. | 349/152 |
| 6,388,722 | B1 | * | 5/2002 | Yoshii et al. | 349/58 |
| 6,411,353 | B1 | * | 6/2002 | Yarita et al. | 349/59 |

* cited by examiner

*Primary Examiner*—William L. Sikes
*Assistant Examiner*—Tarifur R. Chowdhury (57) ABSTRACT

In a liquid crystal display device including a pair of substrates between which a liquid crystal layer is interposed, a semiconductor integrated circuit device provided at a periphery of a liquid crystal layer side surface of one substrate of the pair of substrates, a frame member having a display window and covering the substrates, and a spacer provided between the frame member and the periphery of the liquid crystal side surface of the one substrate, the present invention prevents the substrate from being cracked during assembly processes thereof and improves product quality thereof by protruding one side of the spacer toward another substrate of the pair of substrates partly, disposing the semiconductor integrated circuit device along a concave part of the spacer with respect to the another substrate, and providing an adhesive at a surface of the protruded part of the spacer opposite to the liquid crystal layer side surface.

4 Claims, 6 Drawing Sheets

LIQUID CRYSTAL DISPLAY DEVICE INCLUDING A SPACER WITH ADHESIVE BETWEEN FRAME AND A PERIPHERY OF A PRINCIPAL SURFACE OF A SUBSTRATE

BACKGROUND OF THE INVENTION

1. Field of the Invention

The present invention relates generally to liquid crystal display devices for use in personal computers and workstations or else and, more particularly, to effective techniques for application to spacers.

2. Description of the Related Art

Liquid crystal display devices are becoming increasingly well known and commercially available for use as monitor units of modern digital equipment including, but not limited to, laptop personal computers and desktop computers. Today, liquid crystal display modules of the super twisted nematic (STN) or thin-film transistor (TFF) type are widely employed as display devices of notebook computers.

These liquid crystal display modules are generally constituted from a liquid crystal display panel having semiconductor chips (semiconductor integrated circuit devices making up drain drivers or gate drivers) disposed around the peripheral portions thereof, a back-light unit for illumination of the liquid crystal display panel, and a frame having a display window and covering the liquid crystal display panel and the backlight unit.

Additionally such architecture has been recited, for example, in Japanese Patent Publication No.19474/1985 and also in Published Japanese Utility Model Laid-Open No.22780/1992.

SUMMARY OF THE INVENTION

In such products, the liquid crystal display device is mounted as what is called the liquid crystal display module including in combination its liquid crystal display panel and light source. One typical form of it is disclosed, for example, in Japanese Patent Laid-Open Nos.264991/1993 and 218914/1995. Typically a chip spacer for protection of the semiconductor chips is provided between the frame and liquid crystal display panel.

And this chip spacer is tightly secured by adhesion to both the frame and one substrate of the liquid crystal display panel (in the case of TFT liquid crystal display module, a glass substrate on the TFT substrate side).

However, in prior known liquid crystal display modules, the one substrate could break (crack) from time to time during assembly processes.

The present invention has been made to solve the problem faced with said prior art, and a primary objective of this invention is to provide a technique for preventing occurrence of substrate cracking in a liquid crystal display device during assembly processes, thereby improving the quality thereof.

The above and other objects and new features of the instant invention will become apparent from the disclosure of the specification along with its accompanying drawings enclosed herewith.

In products such as monitor units of laptop personal computers and desktop personal computers, a variety of types of commercial products are becoming available in recent years.

The inventors as named herein have considered about the cause of the cracking of one substrate of the liquid crystal display element (liquid crystal display panel) during assembly of a liquid crystal display module to find that one major problem concerns the position of an adhesive layer as provided at the spacer.

More specifically, in prior art liquid crystal display modules, the adhesive layer is provided on the entire surface of the spacer. This spacer's adhesive layer is provided in such a way as to also cover a wiring substrate or board which is electrically and/or mechanically connected to more than one terminal section being provided at the periphery of the above-noted one substrate.

It has been found that due to this arrangement, a compressive force will first be applied to a region in which the one substrate's wiring board is formed when attaching a frame member during assembly of a liquid crystal display module, and the terminate end portion of such one substrate is inherently weak in physical strength than its remaining regions other than the end portion, thus resulting in occurrence of substrate cracking in this region first.

The present invention has been made in view of the above technical background. Some representative principles of the invention as disclosed herein will be explained in brief below.

More specifically the present invention provides a liquid crystal display device which comprises a liquid crystal display device comprising a liquid crystal display element, a frame member having a display window permitting exposure of a display plane of said liquid crystal display element and covering said liquid crystal display element, and a spacer provided between said frame member and a periphery of a first principal surface of one substrate of said pair of substrates facing said liquid crystal, featured in that said spacer is provided with an adhesive layer at specified part of said first principal surface of said one substrate closer to said liquid crystal than a central portion of the length in the direction crossing one side thereof.

Another feature of the present invention is that said spacer is provided with the adhesive layer at part of said first principal surface of said one substrate closer to said liquid crystal than the central portion of the length at right angles to the one side of said first principal surface.

The present invention also provides a liquid crystal display device comprising a liquid crystal display element having a semiconductor integrated circuit device as provided on a periphery of the liquid crystal side surface of one of the substrates, a frame member having a display window exposing a display plane of said liquid crystal display element and covering said liquid crystal display element, and a spacer provided between said frame member and a periphery of the liquid crystal side surface of said one of the substrates, characterized in that one side (lateral face) of said spacer adjacent to said liquid crystal display element is formed into an even shape (shaped so that the one side protruded toward the liquid crystal display element at plurality of portions thereof), said semiconductor integrated circuit device is disposed along a concave portion thereof, and an adhesive is provided on a surface of a convex portion thereof opposing the liquid crystal side surface of said one substrate. The aforementioned convex portion is defined as a portion of the spacer where the one side is protruded toward the liquid crystal display element, and the aforementioned concave portion is defined as a portion of the spacer (other than the concave portion) where the one side is not protruded toward the liquid crystal display element. In the aforementioned spacer, a plurality of the concave portions and a plurality of the convex portions are arranged alternately along an extension direction of the spacer, and thus the spacer looks like e.g. a profile of rack rail. The aforementioned liquid crystal side surface of one of the substrates is defined as a main surface at a liquid crystal layer side of one of a pair of substrates between which the liquid crystal layer is interposed. The aforementioned semiconductor integrated circuit device is provided on a area of the liquid crystal side being surrounded by one of the aforementioned concave portions and at least one of the aforementioned convex portions (as if it were inserted into a notch formed at the one side of the spacer according to the concave portion). More concretely, the convex portion of the spacer protrudes toward the effective display region of the liquid crystal display element. Therefore, if the spacer is arranged on a area at the periphery of one substrate of the pair of substrates where another substrate of the pair of substrates is not superposed over the one substrate, the convex portion of the spacer protrudes toward an edge of the another substrate, and other portion of the spacer than the convex portion becomes a concave portion with respect to the another substrate.

Another feature of the present invention is that said one substrate has a terminal section at a peripheral edge portion and also has a wiring board as electrically and/or mechanically connected to said terminal section, and that the adhesive layer of said spacer is provided in a region other than a region to be provided with said wiring board.

With the above-stated means, since the position of the adhesive layer to be provided at the spacer is designed so that this adhesive layer is provided at a specified peripheral position of one substrate which is spaced apart by a predetermined distance from one edge portion, it is possible to prevent occurrence of cracking of the substrate of the liquid crystal display element, which in turn makes it possible to improve the product quality.

The above-stated features of the instant invention are also implementable with the following forms.

One example of such forms is that in a liquid crystal display device comprising a liquid crystal display element having a pair of substrate and a layer of liquid crystal interposed between said pair of substrate, a frame member having a first portion opposing a display plane side of said liquid crystal display element and an opening as formed at the first portion for permitting exposure of the display plane, and a spacer being disposed between one substrate of said pair of substrates and said first portion of said frame member and extending along a boundary between said first portion and said opening, an adhesive portion for adhesion between said spacer and the one substrate of said pair of substrates is formed in such a manner that it is spaced apart from an end portion of the one substrate of said pair of substrates extending along said boundary (i.e., line segment whereat the first portion of said frame member is in contact with the opening).

The one substrate of the pair of substrates as used herein may be a display plane side (so-called top surface side) substrate or, alternatively, a back surface side substrate of the liquid crystal display device.

In either case, by forming said adhesive section so that it is distant from the edge portion of the one substrate of said pair of substrates, a gap space extending along this edge portion is formed between said spacer and the one substrate of said pair of substrate.

With such an arrangement, a demonstrable advantage of the invention obtainable in addition to the above-noted effect and advantage is its ability to allow the spacer resiliently deformable into said gap to absorb mechanical forces being applied to the substrate(s) via said frame member from outside of said liquid crystal display device to thereby preclude any possible destruction of the liquid crystal display element otherwise occurring due to such externally applied mechanical forces.

It should be noted that the frame is not always required to cover the entirety of the peripheral edges of the pair of substrates. This frame may be arranged to cover at least part whereat said spacer is to be provided.

In a view point of obtaining these effects, said spacer is preferably designed to have its elasticity or flexibility greater than that of the one substrate of said pair of substrates. One desired example is that the spacer is machined using polyethylene terephthalate. Another example is that it is machined to have a multi-layer of a plurality of films (including more than one synthetic resin film made of polyethylene terephthalate or other similar suitable material, and a metallic film or films).

In case said spacer is laid out so that its edge portion opposing one side of the other substrate of said pair of substrates is spaced apart from one side of the other substrate of this pair of substrates, any forces due to the spacer's bending deformation will no longer be applied to this other substrate of the pair of substrates, thus enabling reduction of display irregularities otherwise taking place at the liquid crystal display element.

A still another example is that in a liquid crystal display device comprising a liquid crystal display element having a first substrate (also called the lower side substrate) with a first principal surface, a second substrate (also called upper side substrate) having a second principal surface narrower than the first principal surface and being disposed to let this second principal surface oppose the first principal surface, and a layer of liquid crystal material interposed between the first principal surface and the second principal surface, a frame member having a first portion opposing a first region (also called picture frame-like region) of said first principal surface which does not oppose said second principal surface and an opening as formed to oppose an upper surface of said second substrate, and a spacer being disposed between said first region of said first principal surface and said first portion of said frame member and extending along an end portion of the first substrate adjacent to the first region, an adhesive portion for adhering said spacer to said first region of said first substrate is formed so that it is distant from an end portion adjacent to said first region of said first substrate.

For the purpose of automation of assembly processes, it is preferable that said spacer be formed to have a band-like shape having a surface along said first region of said first substrate.

In addition, an end portion of said spacer facing an end portion of said second substrate adjacent to said first region of said first substrate is distant from the end portion of said second substrate adjacent to said first region of said first substrate. This arrangement is preferable for suppression of display irregularities of the liquid crystal display device as stated previously.

In case a driver device for driving said liquid crystal display element is built in said first region of said first substrate, said spacer is provided with a plurality of projection portions which are projected toward the end portion of said second substrate adjacent to said first region of said first substrate while disposing said driver device so that it is put between a pair of certain ones of the plurality of projections. With this arrangement it is possible to make thinner the liquid crystal display device without spoiling the advantages of the present invention stated supra.

At this time it is preferable that said adhesive section be formed only at either one of said plurality of projections.

The above-stated principal features of the present invention will also be described in more specific preferred forms for reduction to practice as will be set forth later in the description. Any members and structures as disclosed therein may be replaced by any other alternative ones without suffering from any appreciable hindrance to the practical implementation of the present invention.

These and other objects, features and advantages of the present invention will become more apparent from the following description when taken in conjunction with the accompanying drawings.

DETAILED DESCRIPTION

Preferred embodiments of the present invention will now be explained in detail with reference to the accompanying drawings below.

Note here that in all the drawings for explanation of the embodiments, those having the same function are added with the same reference character, and any repetitive explanation thereof will be eliminated herein.

<Embodiment 1>
<<Basic Structure of TFT Liquid Crystal Display Module with the Invention applied thereto>>

Figure 1:
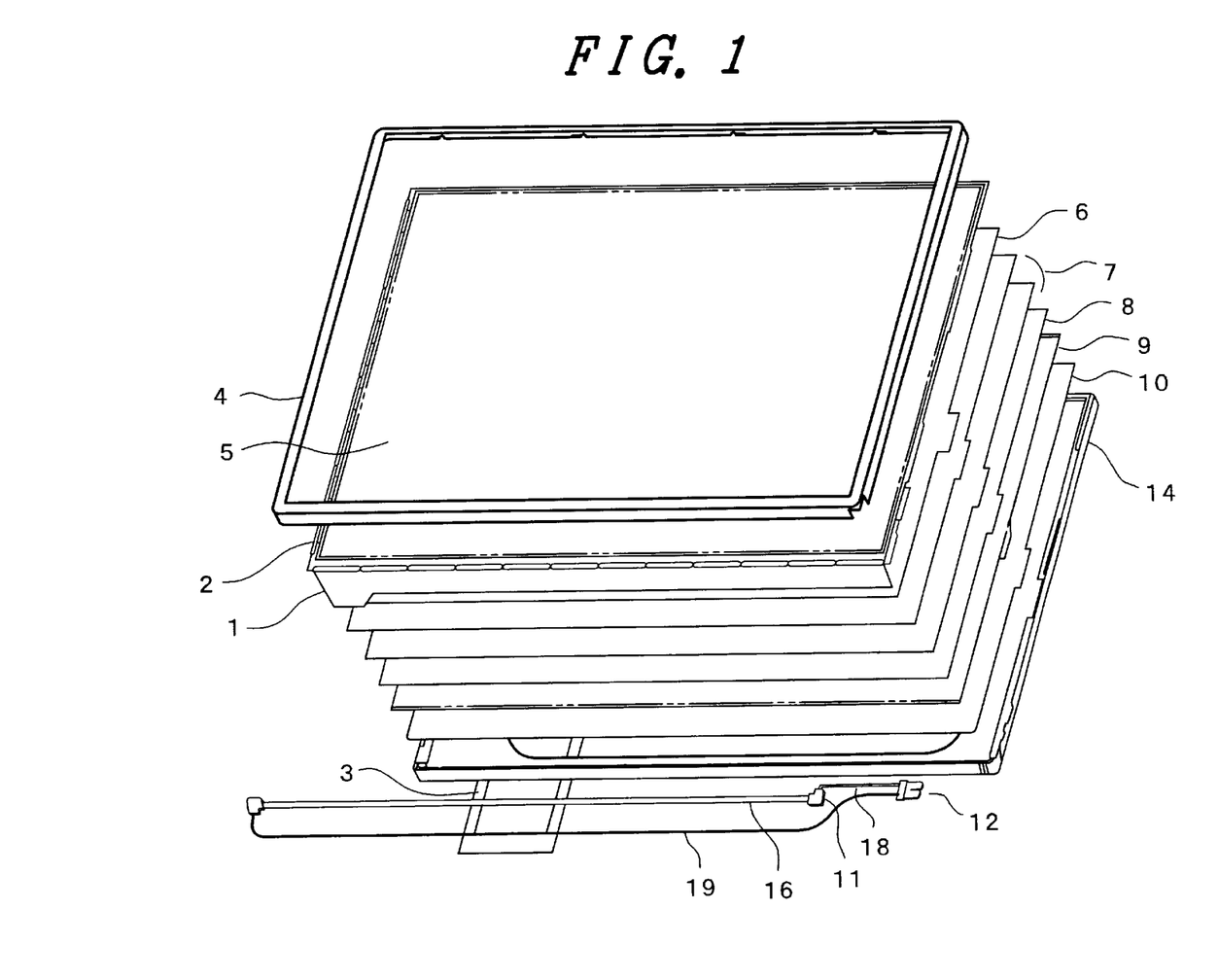
FIG. 1 is a diagram showing an exploded perspective view of a basic structure of a TFT-type liquid crystal display module (LCM) to which the present invention is applied.

FIG. 1 is a diagram showing an exploded perspective view of the basic structure of a liquid crystal display module (LCM) of the TFT type to which the invention is applied.

The TFT liquid crystal display module (LCM) shown in FIG. 1 is generally structured from a casing trim-like frame 4 formed of a metal plate, a liquid crystal display (LCD) panel (i.e. the liquid crystal display element of this invention) 5, and a back-light unit.

The liquid crystal display panel 5 is constructed by arranging a TFT substrate having pixel electrodes, thin-film transistors, etc being formed thereon and a filter substrate having a counter electrode, a color filter, etc being formed thereon in superposition on one another with a predetermined gap space between these substrates, and by bonding these substrates with a seal material being provided to have a frame-like shape at certain part adjacent to peripheral edge portions between both of the substrates. Liquid crystals are introduced into an interior space of the seal material between the both substrates from a liquid crystal inlet port as provided at part of the seal material, and then sealed therein. After sealing the liquid crystals in the liquid crystal display panel, optical polarization plates are adhered to outsides of both the TFT substrate and the filter substrate.

A plurality of drain drivers and gate drivers are mounted on a glass substrate of the TFT substrate, each of which drivers is formed of a semiconductor integrated circuit device (semiconductor IC chip).

The drain drivers are each supplied a driving power supply and display data plus control signal through a flexible printed wiring board 1 whereas the gate drivers are each supplied a drive power supply and control signal via a flexible printed wiring board 2.

These flexible printed wiring boards (1, 2) are connected to a driver circuit board 3, which is provided behind the backlight unit.

The backlight unit of the TFT liquid crystal display module shown in FIG. 1 is arranged so that a cold-cathode fluorescent lamp 16, wedge-shaped light guide body 9 (side thereof being shaped like a trapezoid), optical diffusion sheets (6, 8), lens sheet 7 and reflection sheet 10 are inserted and fitted into a mold 14 with a frame-like shape in a specified assembly order shown in FIG. 1.

Note that the mold 14 is made of polycarbonate or acrylonitrile butasiene styrene (ABS) region material. Additionally in FIG. 1, reference numeral 11 is used to designate a rubber bush; 12 denotes a connector; 18 is a high-voltage side cable; 19, a ground (GND) side cable.

The TFT liquid crystal display module (LCM) shown in FIG. 1 is arranged so that the liquid crystal display panel 5 with multiple drain drivers and gate drivers mounted thereon is housed between the frame 4 having a display window and the backlight unit.

And a region of the display window of frame 4 constitutes the display region of the liquid crystal display module (LCM); the remaining region other than this display region—i.e. region surrounding the display window of frame 4—is ordinarily called "picture frame" plate.

It should be noted that although not specifically depicted in FIG. 1, the liquid crystal display module shown in FIG. 1 is such that a chip spacer is provided between the frame 4 and the periphery of liquid crystal display panel 5 whereat respective drivers are provided.

This chip spacer is provided for preventing application of unwanted compressive forces to respective drivers via the frame 4.

Typically this chip spacer is designed so that adhesive layers are provided on its both surfaces for permitting adhesion to the frame 4 and the liquid crystal display panel 5's periphery whereat respective drivers are provided, thereby precluding any possible deviation of the liquid crystal display panel 5 (liquid crystal display panel 5's movement) otherwise occurring due to shocks. Additionally this chip spacer has a shape as will be described later.

<<Characteristic Structure of TFT Liquid Crystal Display Module embodying the Invention>>

Figure 2:
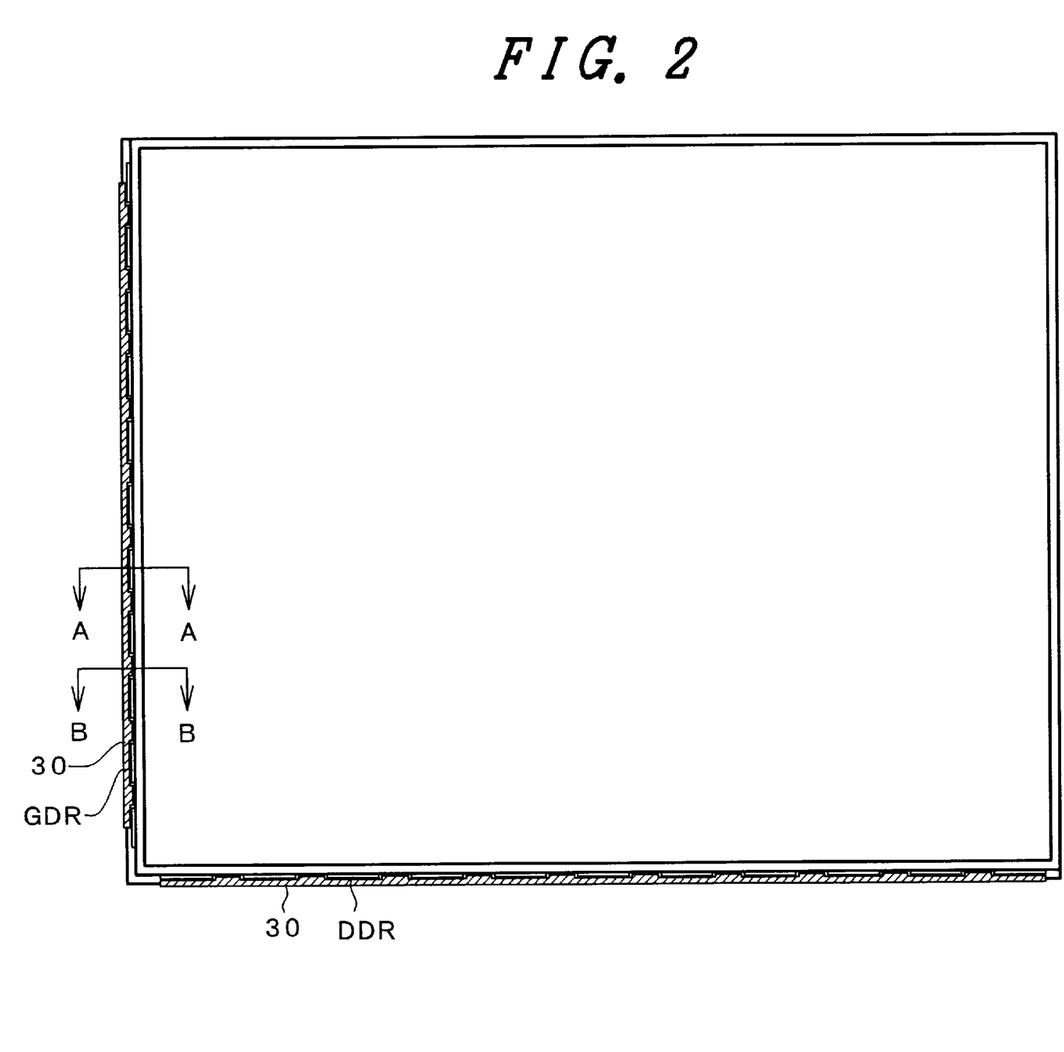
FIG. 2 is a diagram showing a state of the TFT liquid crystal display module of an embodiment 1 of this invention, wherein a chip spacer was attached to selected part around a liquid crystal display panel.

FIG. 2 is a diagram showing a state of the TFT liquid crystal display module in accordance with one embodiment of the invention, wherein the chip spacer 30 was attached to outer peripheral part of the liquid crystal display panel 5.

As shown in FIG. 2, the chip spacer 30 is provided in a specified region at the periphery of the liquid crystal display panel 5, in which region the drain drivers (DDR) and gate drivers (DGR) are disposed.

Figure 3:
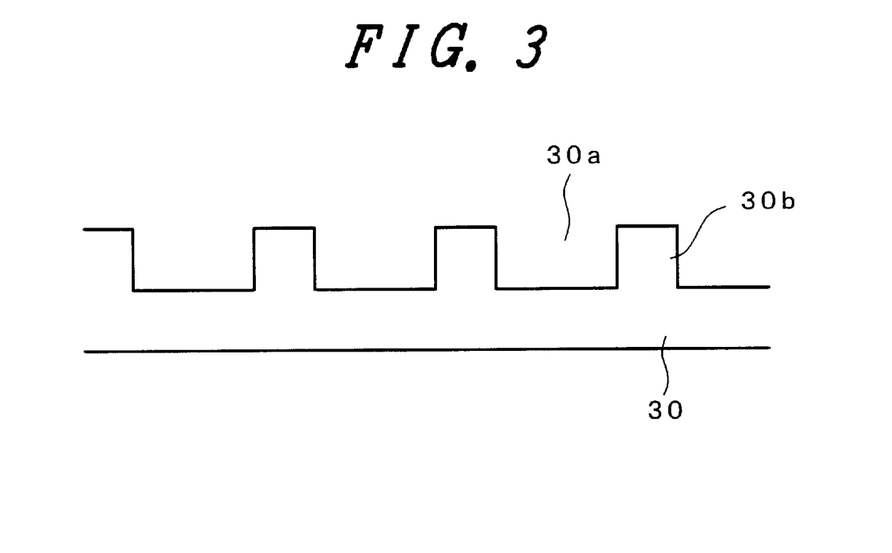
FIG. 3 is a plan view diagram for explanation of a shape of the chip spacer shown in FIG. 2.

FIG. 3 is a plan view diagram for explanation of the shape of the chip spacer 30 shown in FIG. 2.

As shown in FIG. 3 the chip spacer 30 has its one side edge (the side opposing the drain drivers (DDR) and gate drivers (DGR)) which is formed to have a comb-like shape with recess portions 30a and convex portions 30b are provided alternately.

And as shown in FIG. 2, the chip spacer 30 is attached to the liquid crystal display panel 5 in such a manner that a drain driver (DDR) or gate driver (DGR) is placed within each concave portion 30a.

Additionally this chip spacer 30 is made, for example, of polyethylene terephthalate (PET).

Figure 4:
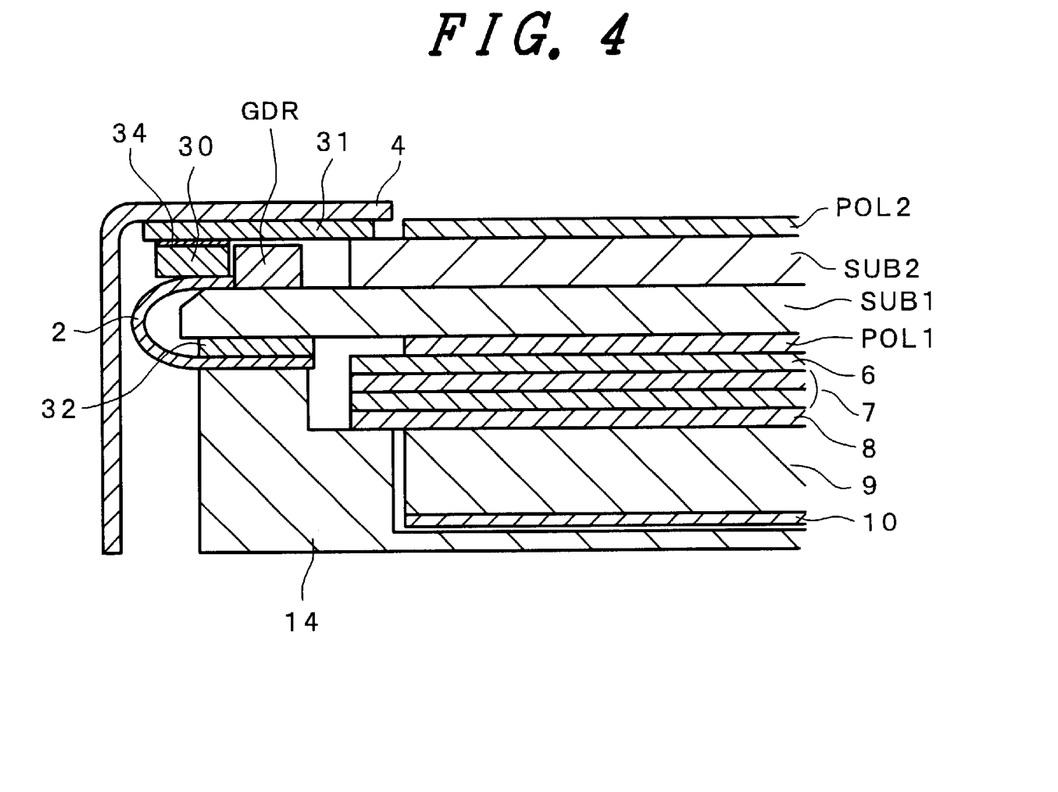
FIG. 4 is a diagram pictorially depicting a schematical cross-sectional structure of certain part of the liquid crystal display module in this embodiment of the invention as taken along line A–A' shown in FIG. 2.
Figure 5:
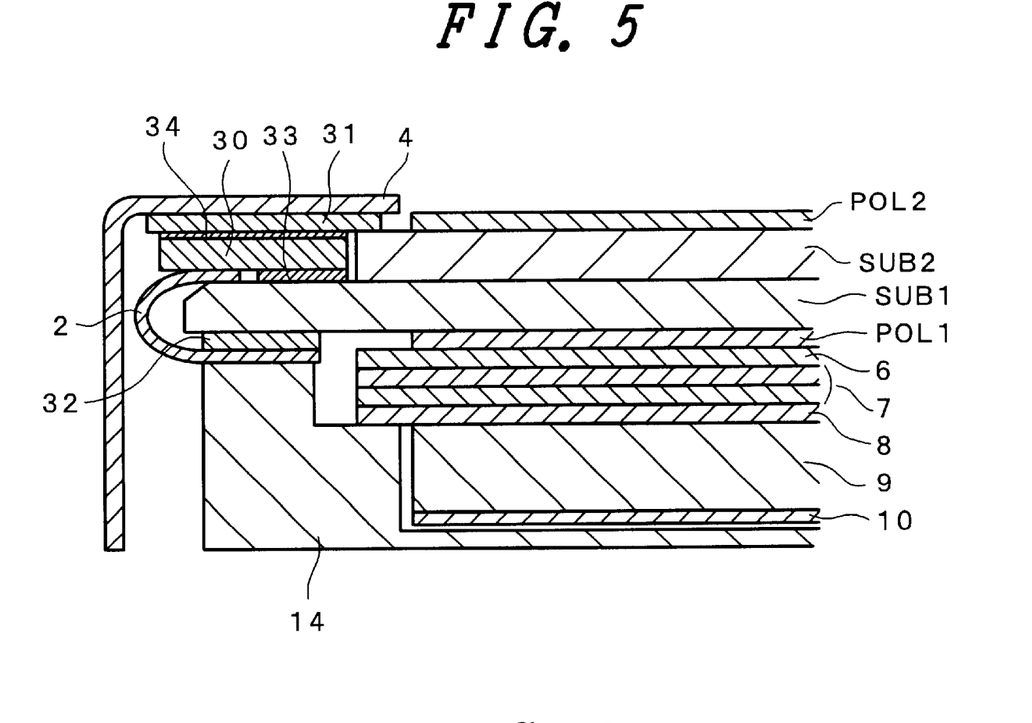
FIG. 5 is a diagram pictorially showing a schematic sectional structure of part of the liquid crystal display module of this embodiment as taken along line B–B' in FIG. 2.

FIG. 4 is a diagram pictorially showing a schematical sectional structure of the liquid crystal display module of this embodiment as taken along line A–A' shown in FIG. 2; and, FIG. 5 is a diagram pictorially showing a schematic sectional structure of the liquid crystal display module of this embodiment as taken along line B–B' shown in FIG. 2.

In FIGS. 4–5, reference character SUB1 designates a glass substrate on the TFT substrate side; SUB2 denotes a glass substrate on the filter substrate side; POL1, POL2 indicate polarization plates; 31 shows a one-sided adhesive tape; 32 is a double-sided adhesive tape; 33, an adhesive layer as provided on the lower side (opposite plane side to the glass substrate (SUB1)) of the chip spacer 30; 34, an adhesive layer provided on the upper side (opposite plane side to the frame 4) of the chip spacer 30, wherein the remaining reference characters used herein are the same as those in FIG. 1.

As shown in FIGS. 4–5, the flexible printed wiring board 2 on the gate driver (GDR) side has its one side which is electrically and/or mechanically connected to a terminal section as provided at an end portion of the glass substrate (SUB1) and a remaining side which is folded and fixed to the lower side of the glass substrate (SUB1) by the double-sided adhesive tape 32 on the lower side of the glass substrate (SUB1).

The chip spacer 30 is secured by the adhesive layer 34 being provided on the upper side of chip spacer 30 to the one-sided adhesive tape 31 being adhered to the lower side of the frame 4 and also fixed to the glass substrate (SUB1) by adhesive layer 33 as provided on the lower side of the chip spacer 30.

With such an arrangement, deviation of the liquid crystal display panel 5 (movement of liquid crystal display panel 5) occurring due to shocks is prevented.

Figure 6:
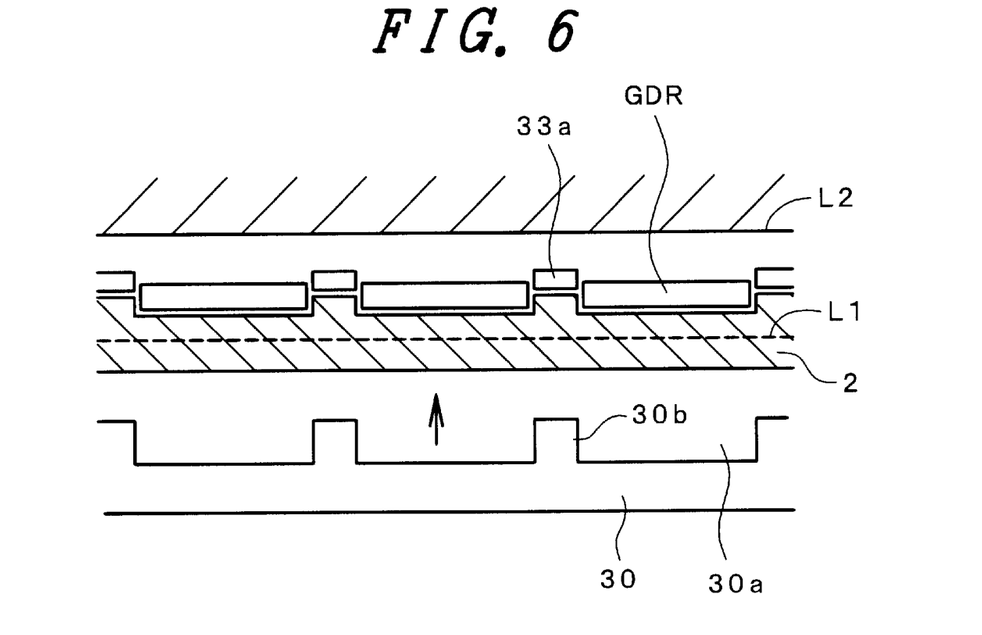
FIG. 6 is a diagram showing a pictorial representation for explanation of the position of an adhesive layer as provided on lower side of the chip spacer of the embodiment 1 of the invention.

FIG. 6 is a diagram showing a pictorial representation for explanation of the position of the adhesive layer 33 that is provided on the lower side of the chip spacer 30 of this embodiment.

In FIG. 6, L1 designates an edge of the glass substrate (SUB1); L2 denotes an edge of the glass substrate (SUB2). Also in FIG. 6, a region indicated by right-downward oblique line (back slash line) shows the flexible printed wiring board 2.

Also in FIG. 6, 33a shows a position over the glass substrate (SUB1) to which the adhesive layer 33 is adhered, the layer 33 being provided on the lower side of the chip spacer 30.

As shown in FIG. 6, in the illustrative embodiment, the adhesive layer 33 as provided beneath the chip spacer 30 is provided at a specified location which underlies the convex portions 30b of the chip spacer 30 and does not overlap the flexible printed wiring board 2.

Figure 7:
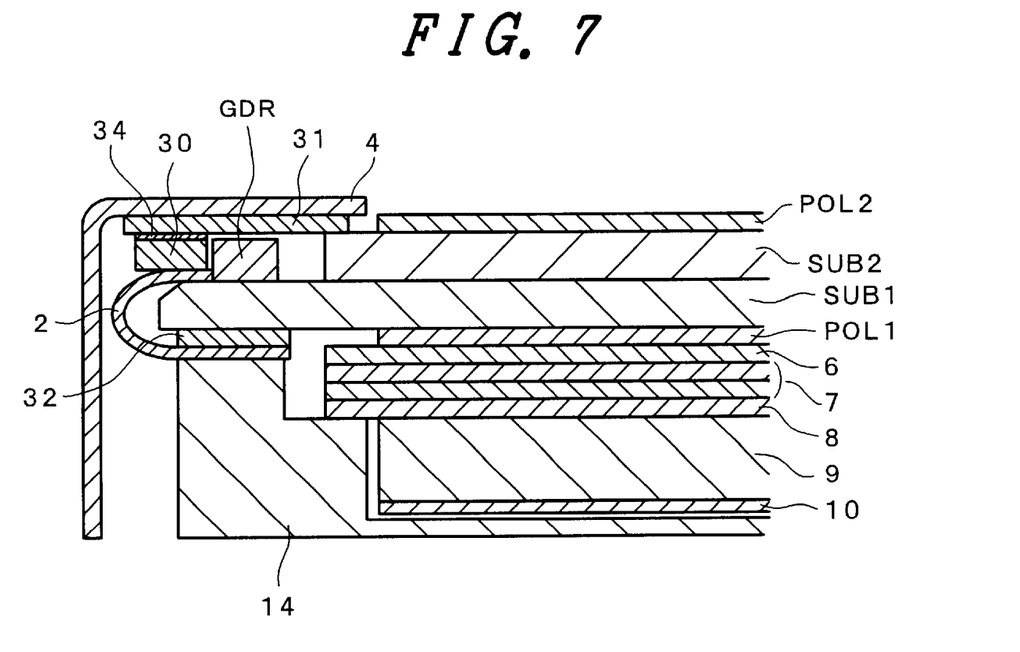
FIG. 7 is a diagram schematically showing, in cross-section, an arrangement of one prior known TFT liquid crystal display module.
Figure 8:
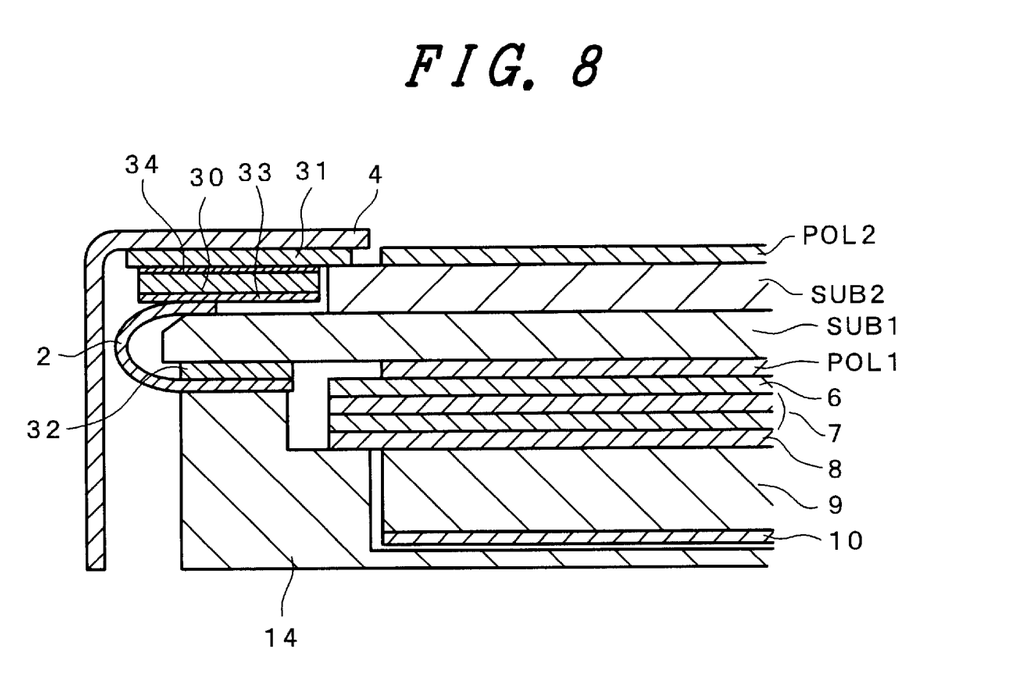
FIG. 8 is a diagram schematically showing in cross-section an arrangement of another prior art TFT liquid crystal display module.

FIGS. 7 and 8 are diagrams each depicting, in cross-section, a schematic arrangement of one prior art TFT liquid crystal display module, wherein FIG. 7 is a pictorial sectional diagram showing a schematical sectional structure of the same part as that of FIG. 4 whereas FIG. 8 is a pictorial sectional diagram showing a schematic sectional structure of the same part as that of FIG. 5.

Figure 9:
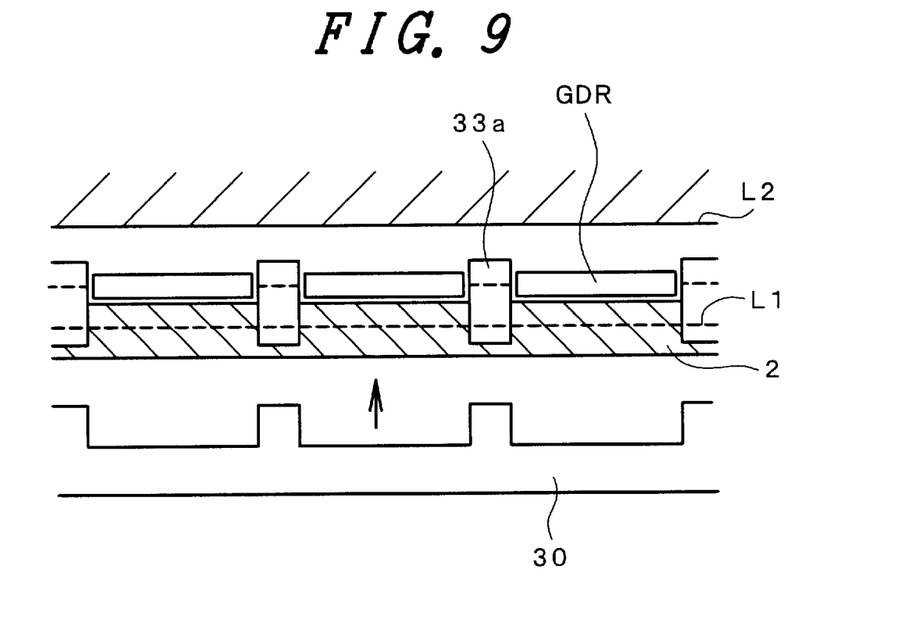
FIG. 9 is a diagram showing a pictorial representation for explanation of the position of an adhesive layer as provided beneath a chip spacer of the prior art TFT liquid crystal display module.

FIG. 9 is a diagram showing a pictorial representation for explanation of the position of adhesive layer 33 as provided on the lower side of the chip spacer 30 in the prior art liquid crystal display module.

As shown in FIGS. 7 to 9, in the prior art TFT liquid crystal display modules, the adhesive layer 33 being provided beneath the chip spacer 30 has been provided on the entire surface on the lower side of convex portions 30b of the chip spacer 30.

With such a structure, when attaching the frame 4 during assembly processes of the TFT liquid crystal display module, a compressive force will first be applied to the region of the glass substrate (SUB1) to which the flexible wiring board 2 is secured because of the fact that such compressive force is first applied to the flexible printed wiring board 2 that is electrically and/or mechanically fixed to the glass substrate (SUB1).

And the end portion of the glass substrate (SUB1) is physically weaker than the remaining region thereof to the extent that the glass substrate can crack upon application of a force of 2 Kg thereto; thus, substrate cracking will first occur in this region.

In contrast thereto, this embodiment is arranged so that the adhesive layer 33 being provided beneath the chip spacer 30 is provided at the specific location which underlies the convex portions 30b of chip spacer 30 and does not overlap the flexible printed wiring board 2.

Whereby, in the embodiment, the region that first experiences application of a compressive force to the glass substrate (SUB1) when attaching the frame 4 during assembly of the liquid crystal display module is not the region in which the flexible printed wiring board 2 is fixed but a region which is far spaced apart from the terminate end or edge portion of such glass substrate (SUB1).

This region is stronger against the compressive force than the end portion of the glass substrate (SUB1) to the extent that the glass substrate will no longer crack upon application of a force of 10 Kg; thus it is possible to prevent occurrence of substrate cracking at the glass substrate (SUB1), which in turn makes it possible to improve the product quality.

<<Overall Arrangement of Liquid Crystal Display Device>>

An exploded perspective view of the liquid crystal display device in accordance with the present invention is shown in FIGS. 1 and 2.

It should be noted here that although in said embodiment the adhesive layer 33 being provided beneath the chip spacer 30 is designed to be provided at the location which underlies the convex portions 30b of chip spacer 30 and does not overlap the flexible printed wiring board 2, the present invention should not be limited thereto. A core concept of this invention is that the above-stated function and advantage are obtainable by letting the adhesive layer 33 being provided beneath the chip spacer 30 be provided at a selected position which is spaced by a predetermined distance from the terminate end portion of the glass substrate (SUB1).

More specifically, in this embodiment, the adhesive layer 33 being provided beneath the chip spacer 30 may be designed so that it is provided in a region closer to the glass substrate (SUB1) side than a central portion of a length in a direction at right angles to one side of the glass substrate (SUB1).

[Embodiment 2]

This embodiment is an embodiment which applies the present invention to a liquid crystal display module wherein the drain drivers (DGR) and gate drivers (GDR) are mounted by use of tape carrier package (TCP) schemes.

Figure 10:
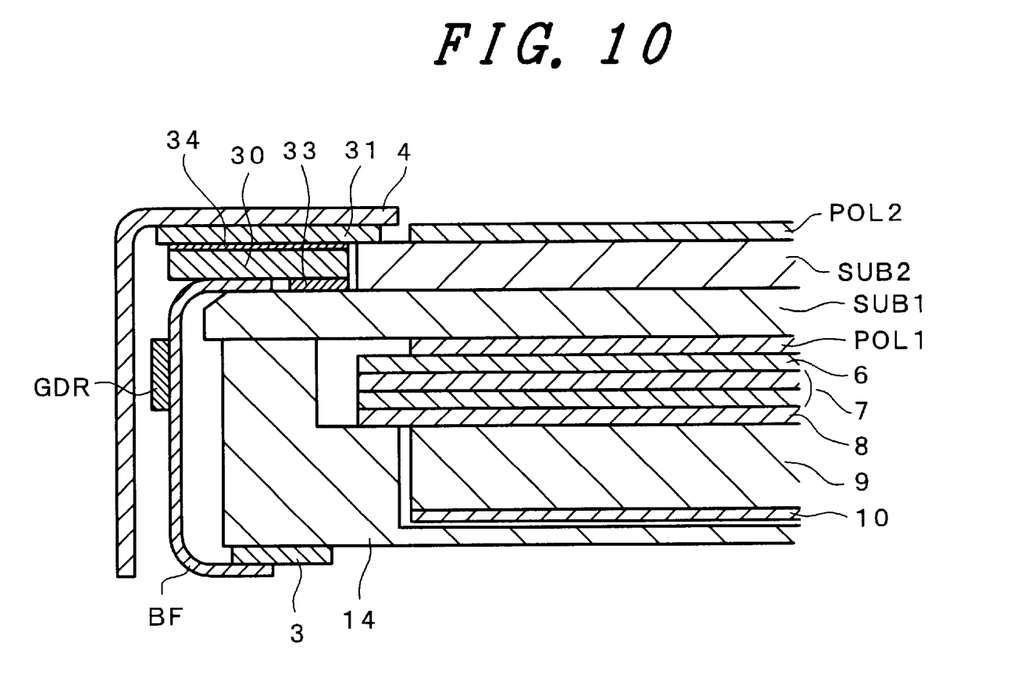
FIG. 10 is a diagram schematically showing, in cross-section, an arrangement of a TFT liquid crystal display module in accordance with an embodiment 2 of the invention.

FIG. 10 is a pictorial sectional diagram showing a schematical arrangement of a TFT liquid crystal display module in accordance with this embodiment; this diagram, FIG. 10, is a pictorial sectional diagram showing the schematic sectional structure of certain part corresponding to that shown in FIG. 4 (or FIG. 5).

As shown in FIG. 10, in this embodiment, gate drivers (GDR) are mounted on a base film (BF) of a tape carrier package, which film has the other end connected to a driver circuit board 3.

In this embodiment also, it is possible to obtain the intended functions and advantages similar to those in said embodiment, by designing the adhesive layer 33 being provided beneath the chip spacer 30 in a way such that this layer is provided at a specific location that underlies the chip spacer 30 and does not overlap the flexible printed wiring board 2.

It is noted that in this embodiment also, the above-noted functions and advantages are obtainable by providing the adhesive layer 33 being provided beneath the chip spacer 30 at a location spaced by a predetermined distance from the terminate end portion of the glass substrate (SUB1), that is, providing the adhesive layer 33 being provided beneath the chip spacer 30 in the region closer to the glass substrate (SUB1) side than the center of the length in the direction perpendicular to one side of the glass substrate (SUB1) of the chip spacer 30.

Further, although in said respective embodiments the present invention has been explained in conjunction with specific embodiments applied to TFT liquid crystal display modules, this invention should not exclusively be limited thereto and, needless to say, may also be applied to STN liquid crystal display modules.

While the invention made by the inventors as named herein has been set forth in detail on the basis of said embodiments, the invention should not be limited to said embodiments only and may be modified and altered in a variety of different forms without departing from the true spirit and scope of the invention.

An effect obtainable by a representative one of the principles of the invention as disclosed herein will be explained in brief below.

According to the liquid crystal display device of this invention, it is possible to prevent the substrates of a liquid crystal display element from cracking, which in turn makes it possible to improve the quality of products.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A liquid crystal display device comprising:

a liquid crystal display element having a pair of substrate and a layer of liquid crystal interposed between said pair of substrate;

a frame member having a display window permitting exposure of a display plane of said liquid crystal display element and covering said liquid crystal display element;

a spacer provided between said frame member and a periphery of a first principal surface of one substrate of said pair of substrates facing said liquid crystal; and said spacer being provided with an adhesive layer at specified part of said first principal surface of said one substrate closer to said liquid crystal than a central portion of a length in a direction crossing one side of said first principal surface.

2. The liquid crystal display device according to claim 1, wherein said spacer is provided with the adhesive layer at part of said first principal surface of said one substrate closer to said liquid crystal than the central portion of the length at right angles to the one side of said first principal surface.

3. A liquid crystal display device comprising:

a liquid crystal display element having a pair of substrate, a layer of liquid crystal interposed between said pair of substrate, and a semiconductor integrated circuit device as provided on a peripheral surface of one substrate of said pair of substrates on the side of said liquid crystal;

a frame member having a display window permitting exposure of a display plane of said liquid crystal display element and covering said liquid crystal display element;

a spacer provided between said frame member and said liquid crystal side peripheral surface of said one substrate; and said spacer being such that one side thereof adjacent to said liquid crystal display element is formed into an uneven shape having a convex portion being protruded forward said liquid crystal display element and a concave portion other than said convex portion for letting said semiconductor integrated circuit device be disposed along said concave portion while providing an adhesive on a surface of a convex portion opposite to said liquid crystal side surface of said one substrate.

4. The liquid crystal display device according to claim 3, wherein said one substrate has a terminal section at a peripheral edge portion and also has a wiring board as electrically and/or mechanically connected to said terminal section, and the adhesive layer of said spacer is provided in a region other than a region to be provided with said wiring board.

* * * * *